US008898761B2

(12) United States Patent
Barkie et al.

(10) Patent No.: US 8,898,761 B2
(45) Date of Patent: Nov. 25, 2014

(54) SYSTEMS AND METHODS FOR GENERATING AND VALIDATING CONFIGURATION FILES FOR COMPUTING DEVICES

(75) Inventors: Eric James Barkie, Morrisville, NC (US); Gary Thomas Leonardi, LaGrangeville, NY (US); Andrew Paul Wyskida, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 13/005,631

(22) Filed: Jan. 13, 2011

(65) Prior Publication Data

US 2012/0185925 A1 Jul. 19, 2012

(51) Int. Cl.
*H04L 29/06* (2006.01)
*G06F 21/57* (2013.01)
*H04L 12/24* (2006.01)
*G06F 21/62* (2013.01)
*G06F 21/51* (2013.01)

(52) U.S. Cl.
CPC .......... *H04L 63/0876* (2013.01); *G06F 21/572* (2013.01); *H04L 41/5051* (2013.01); *G06F 21/6209* (2013.01); *H04L 41/0866* (2013.01); *H04L 41/0806* (2013.01); *H04L 63/20* (2013.01); *G06F 2221/034* (2013.01); *G06F 21/51* (2013.01)
USPC ............................................................ 726/7

(58) Field of Classification Search
CPC ............ H04L 12/2697; H04L 41/0806; H04L 2012/5626; H04L 63/20; H04L 63/0876
USPC ............................................................ 726/7
See application file for complete search history.

(56) References Cited

U.S. PATENT DOCUMENTS

| 5,734,831 | A  | * | 3/1998  | Sanders ....................... 709/223 |
| 5,878,020 | A  | * | 3/1999  | Takahashi ................. 369/59.25 |
| 7,130,279 | B2 | * | 10/2006 | Alves et al. ................... 370/255 |
| 7,420,933 | B2 | * | 9/2008  | Booth et al. .................. 370/254 |
| 7,475,235 | B1 | * | 1/2009  | Bernardy et al. ................. 713/1 |
| 7,685,412 | B1 |   | 3/2010  | Burdick et al. |
| 7,779,089 | B2 | * | 8/2010  | Hessmer et al. ............. 709/220 |
| 8,099,490 | B2 | * | 1/2012  | Deakin ......................... 709/224 |
| 8,583,722 | B1 | * | 11/2013 | Gibson et al. ................ 709/202 |
| 2002/0078126 | A1 | * | 6/2002  | Higgins ........................ 709/200 |
| 2002/0194138 | A1 | * | 12/2002 | Dominguez et al. ............ 705/64 |

(Continued)

OTHER PUBLICATIONS

Verma; Simplifying network administration using policy-based management; Published in: Network, IEEE (vol. 16 , Issue: 2); Date of Publication: Mar./Apr. 2002; pp. 20-26; IEEE Xplore.*

(Continued)

*Primary Examiner* — Bradley Holder
(74) *Attorney, Agent, or Firm* — Louis J. Percello; Ryan, Mason & Lewis, LLP

(57) ABSTRACT

Systems and methods are provided for real-time automated generating and validating configuration files for provisioning computing devices. For example, method for provisioning a computing device includes receiving a user request to configure a computing device to access a service, generating a device configuration file to enable access to the service, validating the configuration file before deploying the configuration file to the computing device by testing configuration settings of the configuration file against the service for which the configuration file is generated to access, and deploying the configuration file to the computing device when the configuration file is deemed valid.

15 Claims, 9 Drawing Sheets

(56) References Cited

U.S. PATENT DOCUMENTS

| | | | |
|---|---|---|---|
| 2003/0055321 A1* | 3/2003 | Watrous et al. | 600/300 |
| 2003/0236865 A1* | 12/2003 | Anthe et al. | 709/220 |
| 2005/0256958 A1* | 11/2005 | Wilson | 709/227 |
| 2006/0187854 A1* | 8/2006 | Booth et al. | 370/254 |
| 2006/0294208 A1 | 12/2006 | Adams et al. | |
| 2008/0034200 A1 | 2/2008 | Polcha et al. | |
| 2008/0082640 A1* | 4/2008 | Chang et al. | 709/220 |
| 2010/0217780 A1 | 8/2010 | Erola et al. | |
| 2010/0250907 A1* | 9/2010 | DeHaan | 713/1 |

OTHER PUBLICATIONS

Nygren et al.; The Akamai network: a platform for high-performance internet applications; Published in: Newsletter ACM SIGOPS Operating Systems Review archive; vol. 44 Issue 3, Jul. 2010; pp. 2-19; ACM Digital Library.*

Written Opinion of the International Searching Authority, dated Apr. 10, 2012 for PCT/US11/64898.

* cited by examiner

300

500

800

900

SYSTEMS AND METHODS FOR GENERATING AND VALIDATING CONFIGURATION FILES FOR COMPUTING DEVICES

TECHNICAL FIELD OF THE INVENTION

This disclosure relates generally to systems and methods for provisioning computing devices and, in particular, systems and methods for real-time automated generating and validating configuration files for provisioning computing devices.

BACKGROUND

In general, provisioning is a process of enabling services on a computing device (e.g., mobile phone). These services include, for example, calendaring, contacts, e-mail, and configuring devices to connect to a wireless network via VPN (virtual private network) or Wifi. During a typical provisioning process for a target computing device, configurations and settings are generated for various services and sent to the target device. This provisioning process, however, can be very difficult to perform properly, and is prone to error, commonly due to incorrect user input, erroneous information from other data stores, and improper server or application settings. Such errors are costly and result in lost employee, help desk and support time.

SUMMARY

In general, exemplary embodiments of the invention include systems and methods for provisioning computing devices and, in particular, systems and methods for real-time automated generating and validating configuration files for provisioning computing devices. In one exemplary embodiment, a method for provisioning a computing device includes receiving a user request to configure a computing device to access a service, generating a device configuration file to enable access to the service, validating the configuration file before deploying the configuration file to the computing device by testing configuration settings of the configuration file against the service for which the configuration file is generated to access, and deploying the configuration file to the computing device when the configuration file is deemed valid.

For example, in one exemplary embodiment, a validating process is implemented by a provisioning server acting on behalf of the user by utilizing credentials of the user to automatically log into an application server providing the service and attempt to access the service on behalf of the user.

In another exemplary embodiment, validating a configuration file may include automatically determining if the user can connect to a wireless network using the computing device if the computing device was configured using the configuration file settings. In another exemplary embodiment, validating a configuration file may include automatically determining if the user can access an e-mail server if the computing device was configured using the configuration file settings. In yet another exemplary embodiment, validating a configuration file may include accessing a server status screen associated with the service, and parsing the status screen to determine if any error messages or warnings are specified on the status screen with regard to one or more configuration settings.

In another exemplary embodiment, validating a configuration file may further include determining if an error results during testing a configuration setting of the configuration file, and automatically attempting to correct the error by modifying the configuration setting resulting in the error. The process of automatically attempting to correct the error may include, for example, automatically adding or modifying an appropriate access control list on a mail database of the user to enable access to the database. In yet another exemplary embodiment, the configuration process is automatically terminated if the error cannot be corrected, and the user is notified that the configuration process has failed without deploying the configuration file to the computing device.

These and other features, objects and advantages of the present invention will become apparent from the following detailed description of illustrative embodiments thereof, which is to be read in connection with the accompanying drawings.

DETAILED DESCRIPTION OF EXEMPLARY EMBODIMENTS

Figure 1:
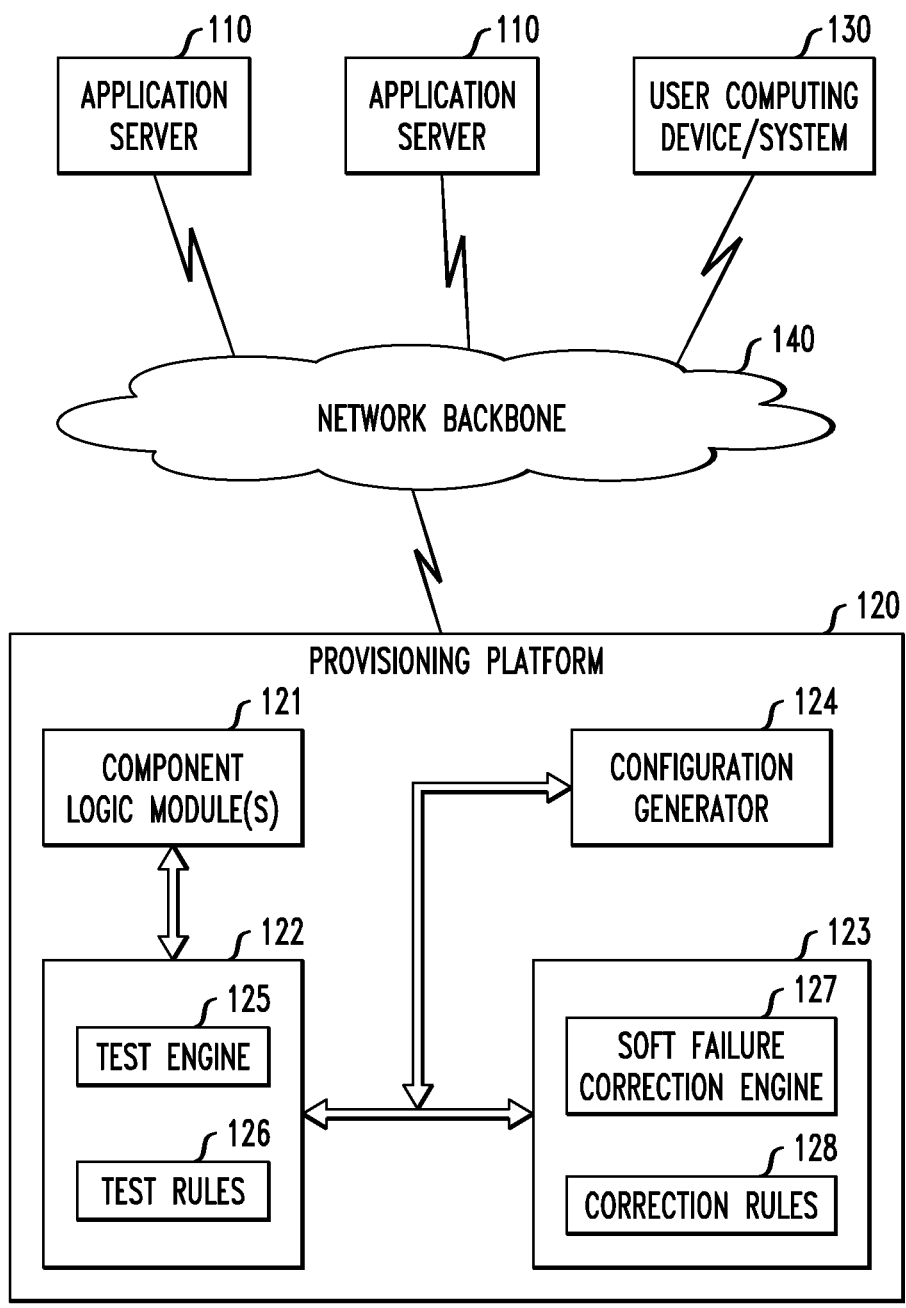
FIG. 1 is a block diagram of a system for provisioning a computing device according to an exemplary embodiment of the invention.

FIG. 1 is a high level block diagram of a system (100) for provisioning a computing device according to an exemplary embodiment of the invention. The system (100) comprises a plurality of application servers (110), a provisioning server platform (120) and a computing device/system (130), which are interconnected over a communications network (140). In general, the provisioning server (120) is a separate platform that is deployed apart from the application servers (110) to generate configuration files which are used to configure user computing devices and systems for accessing services provided by the application servers (110). The computing device/system (130) may be a mobile phone, desktop computer, a server computer, or a virtual server (cloud) system that a user wants to configure for utilizing one or more services provided by one or more of the application servers (110). The user of the computing device/system (130) will access the provisioning server platform (120) to configure the computing device/system (130) for a given application. In accordance with exemplary embodiments of the invention as described in further detail below, the provisioning server (120) generates a configuration file and tests the configuration settings of the configuration file prior to deployment to ensure that the configuration is valid for the given computing device/system (130) to be provisioned.

In general, the provisioning server (120) comprises a plurality of component logic modules (121), a configuration test module (122), a configuration correction module (123) and a configuration generator (124). The configuration test module (122) comprises a test engine (125) and test rules (126). The configuration correction module (123) comprises a soft failure correction engine (127) and correction rules (128).

The configuration generator (124) is used to build a configuration file having configuration settings that are deployed to a computing device/system (130) for enabling access to a service provided by one or more application servers (110). For example, the provisioning platform (120) can generate configuration files that include necessary settings and authentication information configure a device to connect to a wireless network (via WiFi (802.1x) or a VPN (virtual private network). In addition, configuration files can be generated to configure data synchronization services or configuration of Exchange or IMAP/POP e-mail accounts, etc. In other exemplary embodiments of the invention, the application servers (110) may implement a SAN storage system or a network system backup service, for example, and the user of a computing device/system (130) may wish to configure the computing device/system (130) for utilizing the SAN storage system or network system backup service. When generating a configuration file, the provisioning platform (120) will validate the configuration file before deploying the configuration file to the computing device by actually testing configuration settings of the configuration file against the service for which the configuration file is generated to access using a testing protocol specified by the test rules (126) and implemented by the test engine (125).

The component logic modules (121) include low-level routines and protocols that are used by the provisioning platform (120) to test a configuration. More specifically, the component logic modules (121) are application specific protocols that are used by provisioning platform (120) to utilize one or more services provided by the application servers (110) and test a configuration. The component logic modules (121) enable the provisioning platform (120) to "spoof" against actual application servers (110) on behalf of the users and test the configuration settings against services, applications, etc., supported by the application servers (110) and validate the configuration file and ensure that the computing device will operate properly for the given service as desired. In other words, the component logic modules (121) allow the provisioning server (120) to operate as if the server (120) was the computing device to be provisioned and "masquerade" as the user (using the user's credentials) to log into the appropriate services to determine if the configuration file settings are appropriate and valid for the given device to be provisioned.

For instance, when configuring e-mail services, the test rules (126) may specify for the provisioning platform (120) to log onto an e-mail server of the user and attempt to access an e-mail message on behalf of the user. For this process, the provisioning platform (120) may include one or more various types of component logic modules (121) to enable access to different types of mail servers across various types of mobile phone platforms.

When actually testing one or more settings of a configuration file being generated, the provisioning platform (120) can determine that an error results dues to one or more configuration settings of the configuration file. In this regard, the provisioning platform (120) will utilize the configuration correction module (123) to automatically attempt to correct the error by modifying the configuration setting resulting in the error. As explained in further detail below, this correction process is applied to soft test failures using correction rules (128) implemented by the soft failure correction engine (127). For example, when configuring an e-mail service for a mobile device, configuration testing may reveal that the user's mail quota is exceeded or configuration testing may reveal that the user does not have the appropriate permissions to access certain databases. In such instances where the errors are known, the provisioning platform (120) can automatically correct such errors by changing or modifying or adding configuration settings to ensure that the final configuration file sent to the computing device will properly work and provision the computing device to access the given service as intended.

Figure 2:
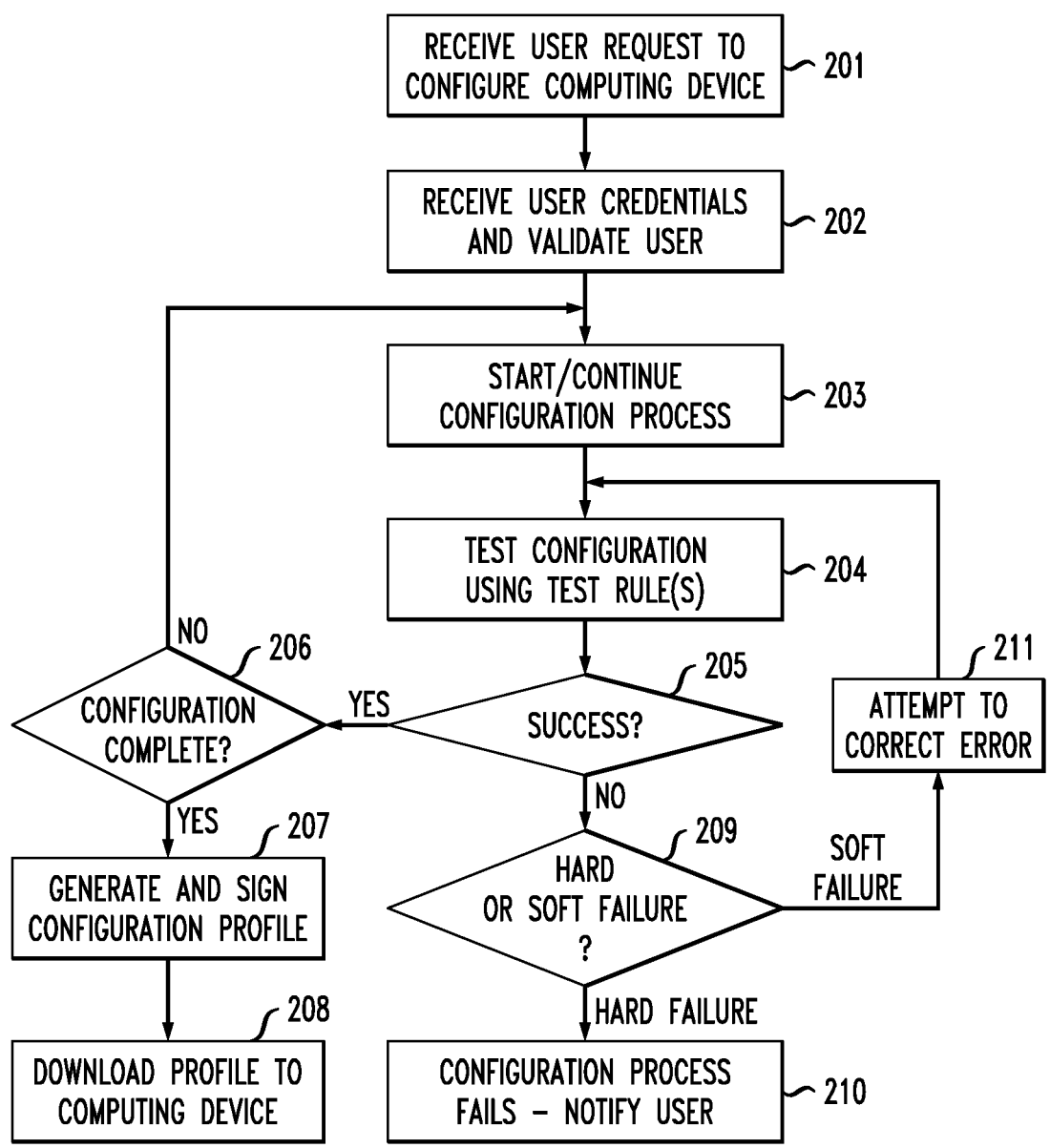
FIG. 2 is a flow diagram of a method for provisioning a computing device according to an exemplary embodiment of the invention.

FIG. 2 is a flow diagram of a method for provisioning a computing device according to an exemplary embodiment of the invention. More specifically FIG. 2 illustrates a method (200) for automatically testing a configuration during a device provisioning process to ensure that all resulting services are operational and working as intended. For purposes of illustration, the method of FIG. 2 will be discussed with reference to the system (100) of FIG. 1, in which case, the flow diagram of FIG. 2 may be considered an exemplary mode of operation of the provisioning platform (120) depicted in FIG. 1.

Referring to FIG. 2, a provisioning process is initiated when the provisioning platform (120) receives a user request to configure a computing device (step 201). For example, the user may request to configure one or more services on a computing device such as a mobile phone. As noted above, services to be provisioned may include, e.g., calendaring, contacts, e-mail services or data synchronization services, or configuring the computing device for access to a wireless network via VPN or WIFI, etc. By way of specific example, the configuration may be an iPhone configuration, MAC configuration, Traveler configuration or Wifi configuration.

The provisioning server (120) receives credentials provided by the user and the server utilizes the user credentials to authenticate the user (step 202). The user credentials may include a known user name and password previously established by the user to authenticate the identity of the user. The user credentials may include further information that enables the provisioning server (120) to determine if the user is entitled to use the services requested by the user.

The provisioning server (120) will begin a configuration process when the user is validated and authorized to access and utilize the requested services (step 203). During the configuration process, the configuration generator (124) of the provisioning server (120) will create a configuration profile that contains configuration settings that are appropriate for the specific user, service and device, depending on the application. As the configuration settings are applied, the provisioning server (120) parses the configuration and tests various aspect of the configuration against the service that the configuration is meant to utilize (step 204). The provisioning server (120) utilizes the configuration test module (122) to test the configuration, wherein the configuration is tested using corresponding test rules (126) that are implemented by the test engine (125).

The process of testing the configuration settings can be done incrementally as the configuration settings are applied or the configuration settings can be tested once the configuration is complete, but prior to downloading a final configuration file to the computing device. At any point at which the configuration settings are tested, one of a plurality of conditions can result from said testing, including, a hard failure, a soft failure or success. A hard failure is a failure is which an error is unknown and cannot be automatically corrected. A soft failure is a failure in which an error is known and can be automatically corrected.

At any given point after one or more configuration settings are tested, a determination is made as to whether the configuration is successful or not successful (step 205). If the test is a success (affirmative decision in step 205), and the configuration is completed (affirmative decision in step 206), then the provisioning server will generate and sign the configuration profile (step 207) and the configuration profile is downloaded to the computing device (step 208). On the other hand, if (at a given point in the configuration) the test is a success (affirmative decision in step 205), and the configuration is not yet complete (negative decision in step 206), then the configuration process continues (step 203).

Moreover, if (at a given point in the configuration) the test is not successful (negative decision in step 205), a determination is made as to whether the test failure is deemed a hard failure or soft failure (step 209). If the configuration test is determined to be a hard failure, then the process is deemed to have failed and the user is notified of the failure (step 210). If the configuration test is determined to be a soft failure, the system will attempt to correct any known errors in the configuration (step 211) and the new configuration is processed and tested again (return to step 204).

It is to be understood that the exemplary embodiments discussed above with reference to FIGS. 1 and 2 are high-level generic descriptions of systems and methods for real time generating and testing configuration files for provisioning computing devices. In other exemplary embodiments of the invention as discussed below with reference to FIGS. 3-8, the provisioning platform (120) of FIG. 1 may be configured for generating and testing configuration files for provisioning a mobile device for specific services including data synchronization push services and wireless connections to VPNs or wireless local networks.

Figure 3:
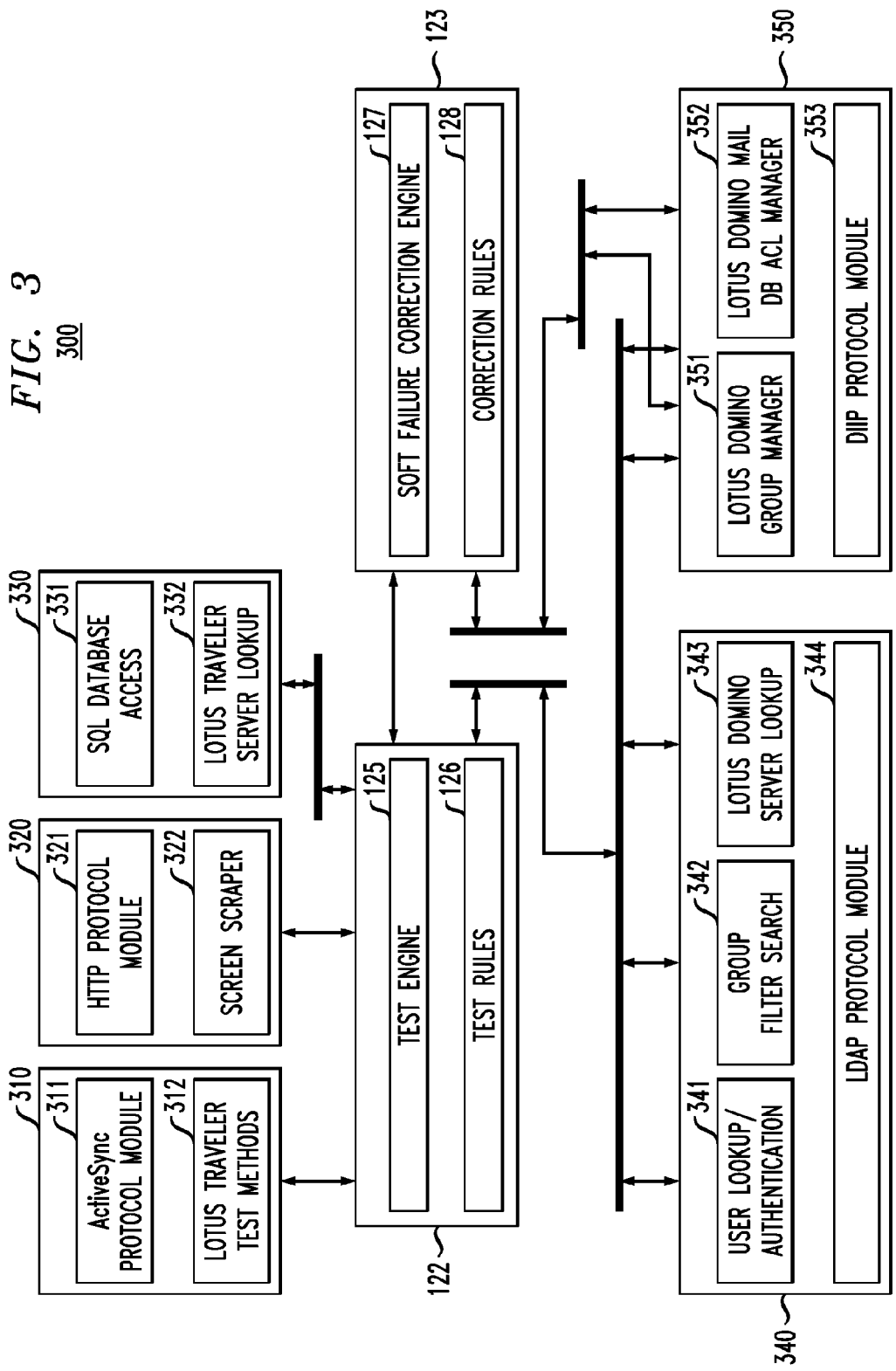
FIG. 3 is a block diagram of a system for provisioning a computing device according to another exemplary embodiment of the invention.
Figure 4:
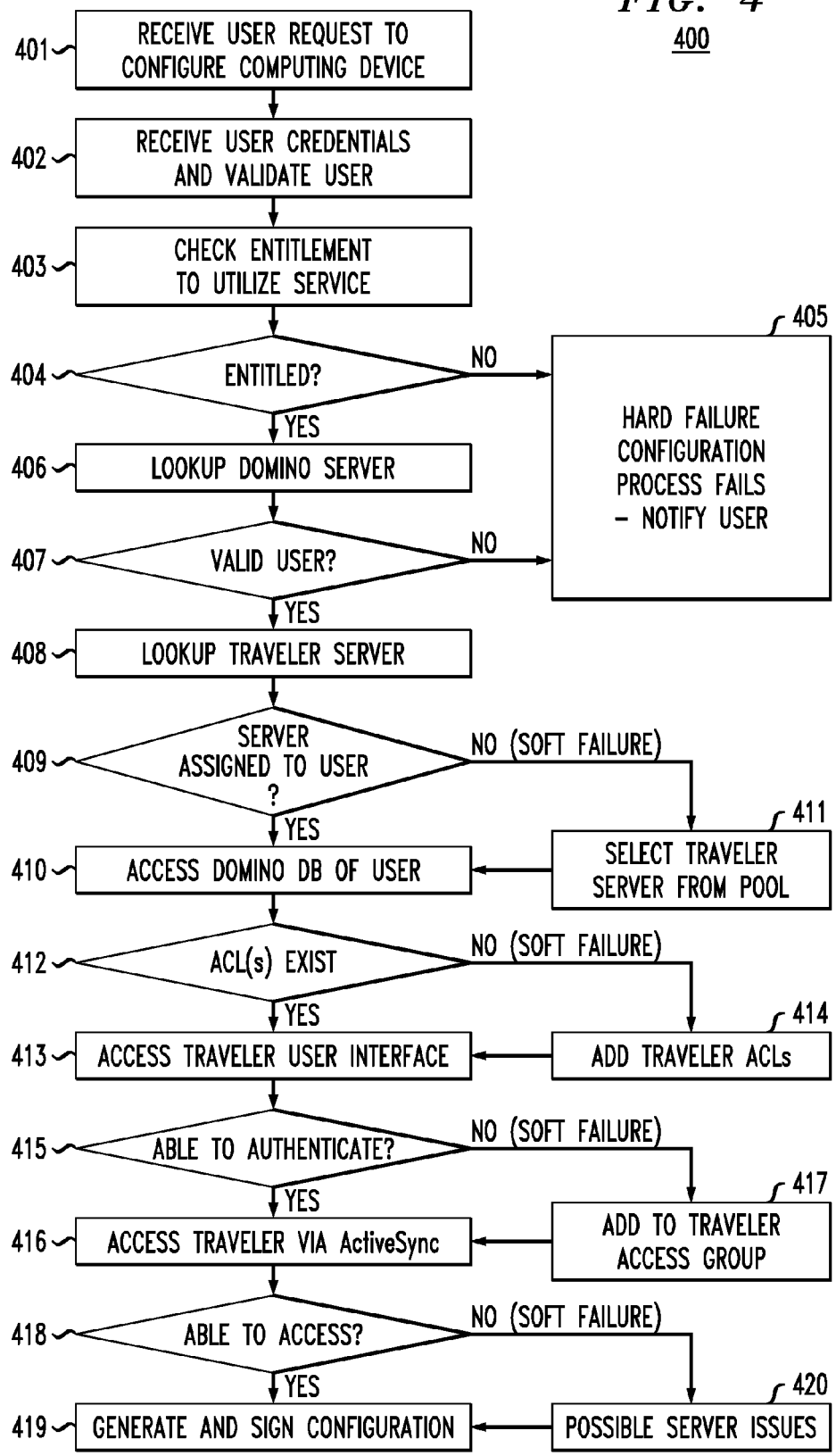
FIG. 4 is a flow diagram of a method for provisioning a computing device according to another exemplary embodiment of the invention.

FIG. 3 is a high level block diagram of a system for provisioning a computing device according to another exemplary embodiment of the invention. In particular, FIG. 3 illustrates an exemplary embodiment of a provisioning platform (300) for configuring a mobile phone platform to enable push access to email and other information on the mobile platform. FIG. 4 is a flow diagram of a method for provisioning a computing device according to an exemplary embodiment of the invention, which illustrates an exemplary mode of operation of the provisioning platform (300) depicted in FIG. 3. More specifically, as described in further detail below, FIGS. 3 and 4 illustrate an exemplary system and method for configuring a mobile device with a software product known as Lotus Notes Traveler™ available from IBM Corporation (Armonk, N.Y.). Lotus Notes Traveler is a software is a push email product that provides access to email and PIM (personal information management) applications for Lotus Notes users using supported mobile devices. Lotus Notes Traveler wirelessly synchronizes email, calendar, contacts, journal and to-do data with a Lotus Domino™ Server available from IBM Corporation (Armonk, N.Y.).

Referring to FIG. 3, similar to the provisioning platform (120) of FIG. 1, the provisioning platform (300) comprises a configuration test module (122) and a configuration correction module (123). The configuration test module (122) comprises a test engine (125) and test rules (126). The configuration correction module (123) comprises a soft failure correction engine (127) and correction rules (128). However, in the exemplary embodiment of FIG. 3, the configuration test module (122) and configuration correction module (123) implement rules for testing a configuration for a mobile phone platform to enable push access to email and other information on the mobile platform using a plurality of component logic modules (310), (320), (330), (340) and (350).

The component logic module (310) comprises an ActiveSync protocol module (311) and Lotus Traveler Test methods module (312). The component logic module (320) comprises an HTTP protocol module (321) and a screen scraper module (322). The component logic module (330) comprises an SQL database access module (331) and a Lotus Traveler Server lookup module (332). The component logic module (340) comprises an Lightweight Directory Access Protocol (LDAP) protocol module, with tables to perform user authentication (340), group filter search (342) and a Lotus Domino Server lookup (343). The component logic module (350) comprises a Domino Internet Inter-ORB Protocol (DIIOP) protocol module (353), a lotus domino group manager module (351) and Lotus Domino Mail database ACL manager (352) (as is known in the art, DIIOP a protocol for Lotus Domino which allows external programs to attach to, and manipulate Domino databases). The application of the various component logic modules of FIG. 3 will be further explained with reference to FIG. 4, which is a flow diagram of a method for provisioning a computing device according to an exemplary embodiment of the invention. More specifically FIG. 4 illustrates an exemplary mode of operation of the provisioning platform (300) depicted in FIG. 3.

Referring to FIG. 4, a provisioning process is initiated when the provisioning platform (300) receives a user request to configure a computing device (step 401). In the exemplary embodiment, the user may request to configure a mobile phone with Lotus Notes Traveler data synchronizing services. The provisioning server (300) receives credentials provided by the user and the server utilizes the user credentials to authenticate the user (step 402). The user credentials may include a known user name and password previously established by the user to authenticate the identity of the user. The user credentials may include further information that enables the provisioning server (300) to determine if the user is entitled to use the services requested by the user. This test may be performed using the protocol module (340) (e.g., LDAP protocol module (344) and user lookup/authentication module (340)).

The provisioning server (300) checks to determine if the authenticated (valid) user is entitled to utilize the requested service (step 403). This entitlement check process is a test rule (126) implemented by the test engine (125) during the configuration process. This test may be performed using the protocol module (340) (e.g., LDAP protocol module (344) and group filter search (342) table).

If the user is determined to not be entitled to use the requested service (negative determination in step 404), then the user is deemed to have insufficient permissions and a configuration hard failure is deemed to occur (step 405). In this instance, the process fails and the user is notified that he/she has insufficient permissions to utilize the requested service.

If the user is determined to be entitled to use the requested service (affirmative determination in step 404), then the provisioning server (300) performs a Lotus Domino Server lookup process to determine the Domino Server assigned to the user (step 406). This lookup process is a test rule (126) implemented by the test engine (125) during the configuration process to determine what Domino Server (or e-mail server) the user is associated with. This test is performed using the protocol module (340) (e.g., LDAP protocol module (344) and Lotus Domino Server Lookup (343) table).

If the user is determined to not be a valid user (i.e., the user does not have a valid Lotus Notes ID) (negative determination in step 407), then a configuration hard failure is deemed to occur (step 405). In this instance, the process fails and the user is notified that he/she is not a valid user.

If the user is determined to be a valid user (affirmative determination in step 407), then the provisioning server (300) performs a Lotus Traveler Server lookup process to determine the user's server (step 408). With this process, the user's Traveler Server is looked up from a cache database that is built dynamically from numerous Traveler access groups. This lookup process is a test rule (126) implemented by the test engine (125) during the configuration process to determine what Lotus Traveler Server is assigned to the user. This test is performed using the protocol module (330) (e.g., SQL database access module (331) and Lotus Traveler Server Lookup module (332)).

If a Lotus Traveler Server is not assigned to the user (negative determination in step 409), then a soft failure is deemed to have occurred. In such instance, a correction process is performed by the soft failure correction engine (127) using a correction rule (128) to select a Traveler Server from a pool of servers to be assigned to the user (step 411). In one exemplary embodiment, this soft failure may be corrected by selecting a least utilized Traveler Server from a pool of available servers and then adding the user to the access database.

If a Lotus Traveler server is assigned to the user (affirmative determination in step 409), then the provisioning server (300) will access the Lotus Domino Database of the user (step 410). More specifically, this process involves accessing the user's mail database using a Lotus Domino API and the user's credentials to view ACLs (access control lists). A determination is made as to whether the user's assigned Traveler Server has access to the user's Domino mail database (step 412). This process is a test rule (126) implemented by the test engine (125) during the configuration process to determine is the proper ACL is in place for the Lotus Traveler Server assigned to the user. If the Lotus Traveler Server ACLs are not in place (negative determination in step 412), then a soft failure is deemed to have occurred. In such instance, a correction process is performed by the soft failure correction engine (127) using a correction rule (128) to add the appropriate Traveler Server ACLs to the user database (step 414). In the exemplary embodiment, steps 410, 412 and 414 are performed via the protocol module (350).

Next, once the proper Traveler ACLs are deemed to exist (affirmative determination in step 412), then the provisioning server (300) will access (log into) the Lotus Traveler User HTTPS Interface on behalf of the user using the user's credentials (step 413). If the system is unable to authenticate (negative determination in step 415), then there is no entitlement on the Traveler server and a soft failure is deemed to have occurred. In such instance, a correction process is performed by the soft failure correction engine (127) using a correction rule (128) to add the Traveler Server to the Domino access group database (step 417). In the exemplary embodiment, steps 415 and 417 are performed via the protocol modules (350) and (351).

In another exemplary embodiment, accessing the Traveler user interface (step 413) may be tested via the protocol module (320) (HTTP protocol module (321) and screen scraper module (322) to parse the user interface for errors. For instance, the screen parsing status may determine that there is an error stating that the ACL's are incorrect, a soft failure may be deemed to have occurred and a correction process (step 414) can be performed to add the appropriate ACLs.

A next step is the configuring process includes the provisioning server (300) accessing the Traveler Server via the ActiveSync protocol (step 416). More specifically, with this process, the server will access the Lotus Traveler Server using the user's credentials and perform an ActiveSync PING Command. This process is a test rule (126) implemented by the test engine (125) during the configuration process (using the protocol module 310, active sync protocol module (311) and lotus test methods (312) to determine whether the user's assigned Traveler Server is currently accessible (step 418). If the Lotus Traveler Server is accessible, then the provisioning server will generate and sign the configuration file for download to the mobile device (step 419). If the provisioning server is unable to access the Lotus Traveler server (negative determination in step 418), then a soft failure is deemed to have occurred. In such instance, an e-mail can be sent to the server support team and the user can be notified that the Traveler server is temporarily offline.

Figure 5:
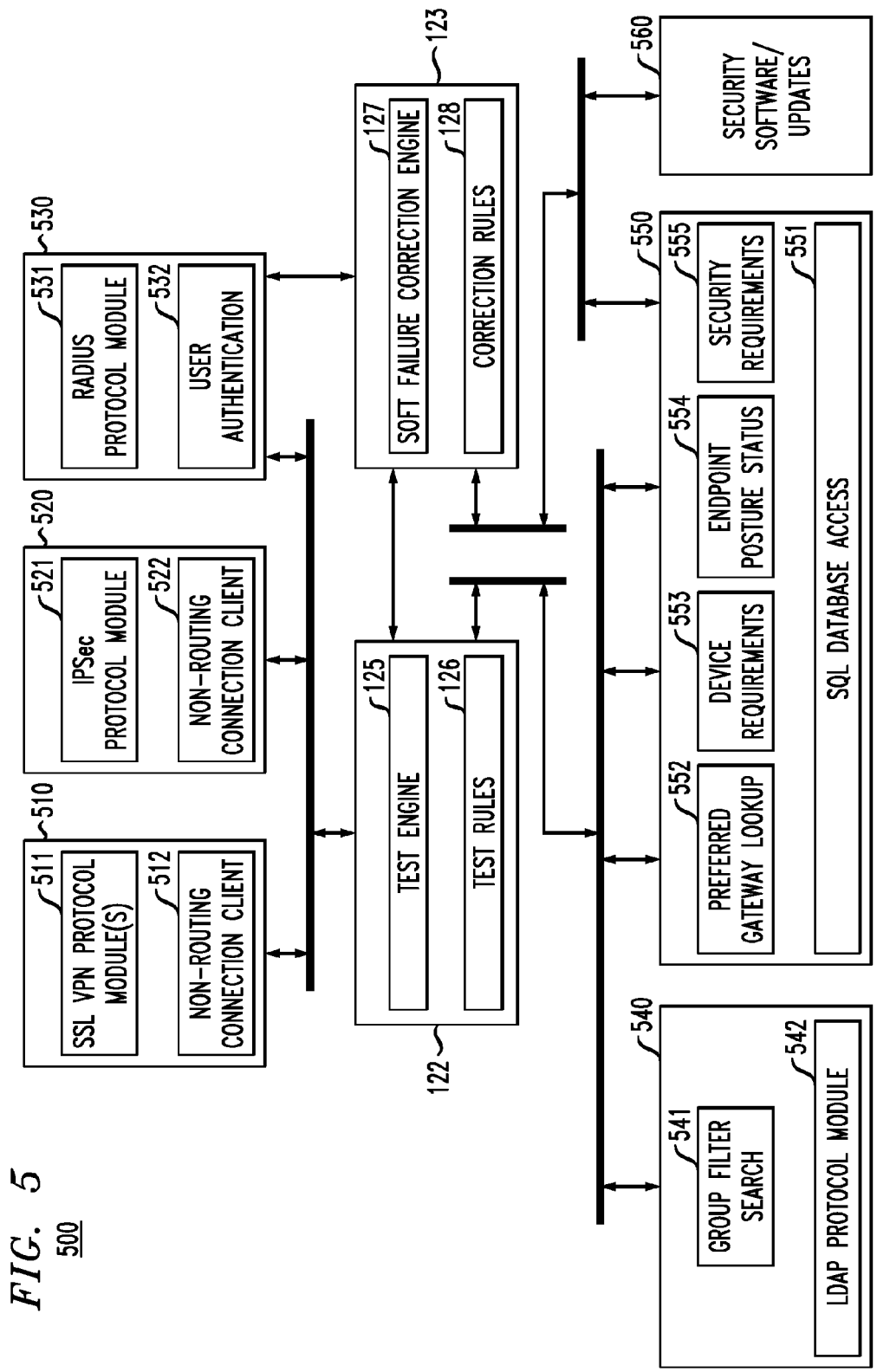
FIG. 5 is a block diagram of a system for provisioning a computing device according to another exemplary embodiment of the invention.

In other exemplary embodiments of the invention, the provisioning platform (120) of FIG. 1 may be configured for generating and testing configuration files to enable a mobile device to connect to a Virtual Private Network (VPN). For example, FIG. 5 is a high level block diagram of a system for provisioning a computing device to use a VPN according to another exemplary embodiment of the invention. In particular, FIG. 5 illustrates an exemplary embodiment of a provisioning platform (500) for configuring a mobile phone platform to access a VPN. Similar to the provisioning platform (120) of FIG. 1, the provisioning platform (500) comprises a configuration test module (122) and a configuration correction module (123). The configuration test module (122) comprises a test engine (125) and test rules (126). The configuration correction module (123) comprises a soft failure correction engine (127) and correction rules (128). However, in the exemplary embodiment of FIG. 5, the configuration test module (122) and configuration correction module (123) implement rules for testing and correcting a configuration for a mobile phone platform to enable access to a VPN using a plurality of component logic modules (510), (520), (530), (540), (550) and (560).

The component logic module (510) comprises a SSL VPN protocol module (511) and non-routing connecting client (512). The component logic module (520) comprises an IPSec Protocol Module (521) and non-routing connection client module (522). The component logic module (530) comprises a RADIUS Protocol Module (531) and a user authentication module (532). The protocol module (540) comprises an LDAP protocol module (542) and group filter search module (541). The protocol module (550) comprises a SQL database access module (551), and various tables such as a preferred gateway lookup table (552), device requirements table (553), endpoint posture status table (554) and security requirements table (555). In addition, the system (500) comprises a security software and updates module (560). The application of the various component logic modules of FIG. 5 will be further explained with reference to FIG. 6, which is a flow diagram of a method for provisioning a computing device according to an exemplary embodiment of the invention. More specifically FIG. 6 illustrates an exemplary mode of operation of the provisioning platform (500) depicted in FIG. 5.

Figure 6:
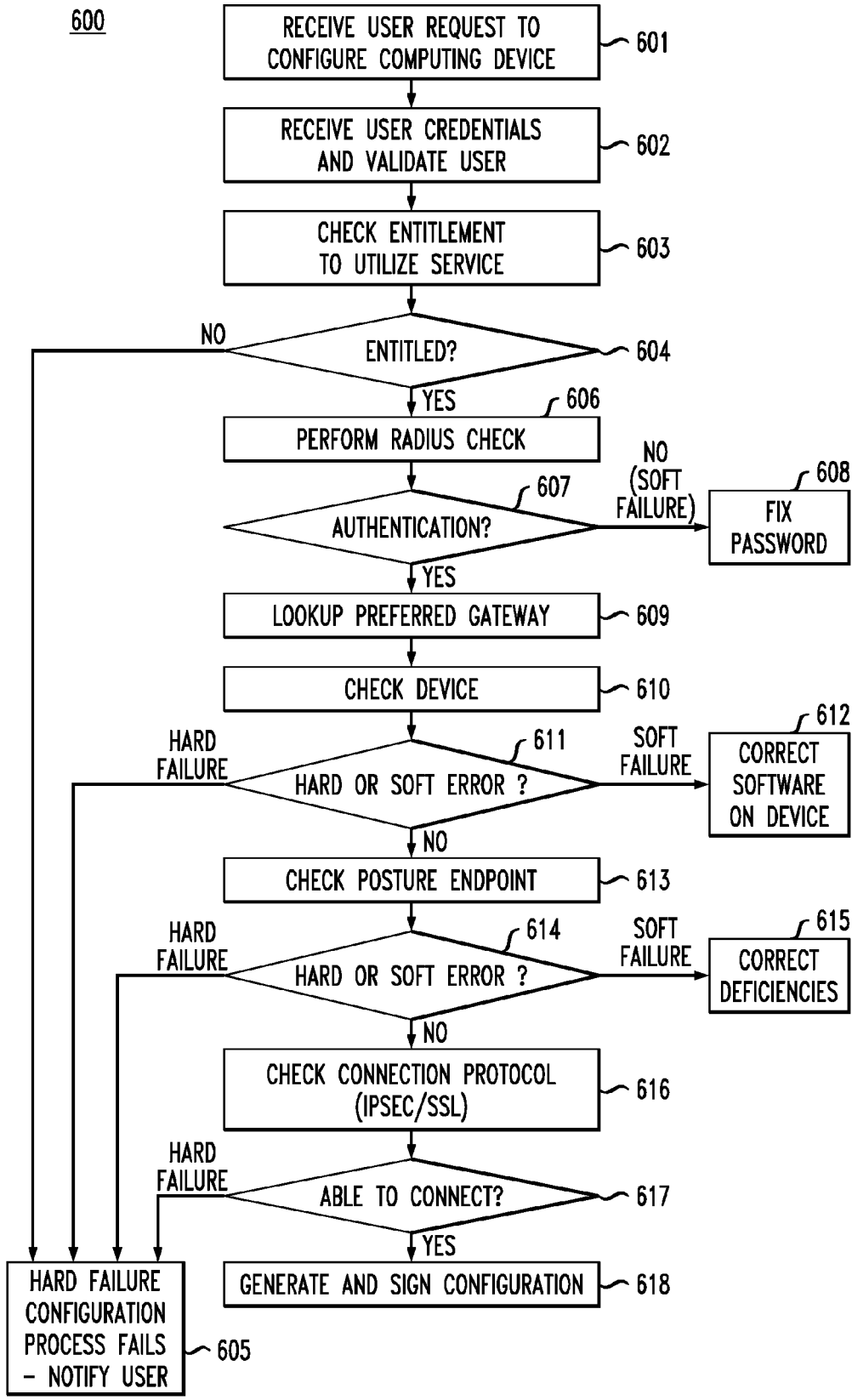
FIG. 6 is a flow diagram of a method for provisioning a computing device according to another exemplary embodiment of the invention.

Referring to FIG. 6, a provisioning process is initiated when the provisioning platform (500) receives a user request to configure a computing device (step 601). In the exemplary embodiment, the user may request to configure a mobile phone client to enable access to a VPN. The provisioning server (500) receives credentials provided by the user and the server utilizes the user credentials to authenticate the user (step 602). The user credentials may include a known user name and password previously established by the user to authenticate the identity of the user. The user credentials may include further information that enables the provisioning server (500) to determine if the user is entitled to use the services requested by the user. In one exemplary embodiment of the invention, step 602 is performed by the RADIUS protocol module (531) and user authentication module (532) to authenticate users or devices credentials for accessing the VPN intranet.

The provisioning server (500) then checks to determine if the authenticated (valid) user is entitled to utilize the requested service (step 603). This entitlement check process is a test rule (126) implemented by the test engine (125) during the configuration process. This test is performed using the protocol module (540) (e.g., LDAP protocol module (542) and group filter search (541) table).

If the user is determined to not be entitled to use the requested service (negative determination in step 604), then the user is deemed to have insufficient permissions and a configuration hard failure is deemed to occur (step 605). In this instance, the process fails and the user is notified that he/she has insufficient permissions to utilize the requested service.

If the user is determined to be entitled to use the requested service (affirmative determination in step 604), then the provisioning server (600) performs a RADIUS check process to determine is the user or device is authorized to access the network via an proper password (step 606). This process is a test rule (126) implemented by the test engine (125) during the configuration process via the RADIUS protocol module (531) to determine if the valid user has valid/authorized password. If user password is not valid (negative determination in step 607), then a soft failure is deemed to have occurred. In such instance, a correction process is performed by the soft failure correction engine (127) using a correction rule (128) to fix or otherwise confirm the user's password (step 608).

If the user is determined to be authentic (affirmative determination in step 607), then the provisioning server (500) performs a preferred gateway lookup process (step 609). This lookup process is a test rule (126) implemented by the test engine (125) during the configuration process to select an optimal gateway from a pool of available gateways. This process is performed using the protocol module (550) (e.g., SQL Database Access module (551) and preferred gateway lookup table (552)).

Next, once the proper gateway is selected (step 609), the provisioning server (500) will perform a device check (step 610) to access information of the computing device and determine if the device contains the proper software for accessing the VPN. In particular, the provisioning server (500) will utilize the protocol module (550) (database access (551) and device requirements table (553)) to determine if the given device has proper software/hardware/firmware, etc. for accessing the VPN (e.g., does mobile phone have proper operating system version, etc.). Depending on the results of the device check, either a hard or soft failure may result (step 611). For instance, a soft failure may be determined (in step 611) if the computing device does not have the proper or updated software, but the provisioning server (500) can automatically update/correct any software issues (step 612) via module (560). Otherwise, the device check (step 610) may result in a hard failure that cannot be corrected by the provisioning server (500) and the configuration process will fail and the user will be notified (step 605).

Next, the provisioning server (500) will perform a posture endpoint check (step 613) (via SQL database access module (551) and endpoint posture status table (554)) by comparing various security related criteria of the computing device against what is defined in the securing requirements table (555) as being acceptable for the given applications. For instance, a determination can be made as to whether the user has a pass code defined on the mobile phone, or how many failed attempts to access the network would cause the phone to be locked out of accessing the network, etc. Depending on the results of the endpoint posture check (step 613), either a hard or soft failure may result (step 614). For instance, a soft failure may be determined (in step 615) if the computing device does not have the proper security requirement settings but such settings can be automatically changed to correct deficiencies (via module 560) or manually changed by prompting the user to correct the deficiencies (step 615). Otherwise, the endpoint posture check (step 613) may result in a hard failure that cannot be corrected by the provisioning server (500) and the configuration process will fail and the user will be notified (step 605).

Next, the provisioning server (500) will perform a connection protocol check (step 616) to determine if the computing device can connect to the VPN. In particular, using the protocol modules (510) and (520), the provisioning server will determine if the computing device can connect to the VPN via the IPSec protocol and SSL VPN protocol modules (521) and (511) using the respective non-routing connection client modules.

This process involves connecting to, authenticating and logging onto the VPN on behalf of the computing device to perform a Boolean connection check, i.e., could device connect to VPN, without passing traffic. This process ensures that the device will be able to connect when configured.

If the connection attempt fails (negative determination in step 617), then a hard failure is deemed to have occurred that cannot be corrected by the provisioning server (500) and the configuration process will fail and the user will be notified (step 605). On the other hand, if the connection is successful (affirmative determination in step 617), then the provisioning server (500) will generate and sign the configuration file for download to the mobile device (step 618).

Figure 7:
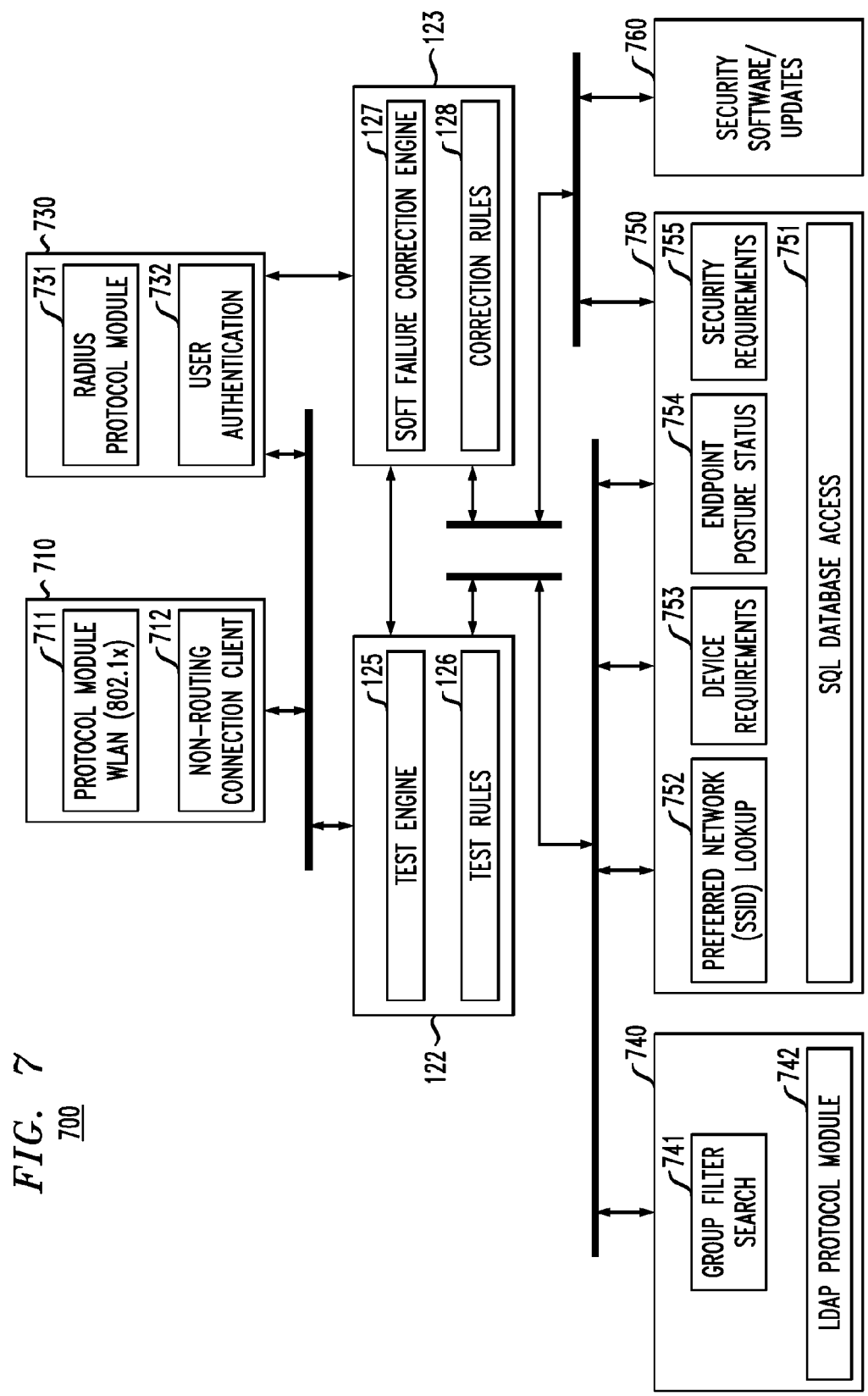
FIG. 7 is a block diagram of a system for provisioning a computing device according to another exemplary embodiment of the invention.

In other exemplary embodiments of the invention, the provisioning platform (120) of FIG. 1 may be configured for generating and testing configuration files to enable a mobile device to connect to a Wireless Network (WLAN). For example, FIG. 7 is a high level block diagram of a system for provisioning a computing device to use a WLAN according to another exemplary embodiment of the invention. In particular, FIG. 7 illustrates an exemplary embodiment of a provisioning platform (700) for configuring a mobile phone platform to access a WLAN. Similar to the provisioning platform (500) of FIG. 5, the provisioning platform (700) comprises a configuration test module (122) and a configuration correction module (123). The configuration test module (122) comprises a test engine (125) and test rules (126). The configuration correction module (123) comprises a soft failure correction engine (127) and correction rules (128). However, in the exemplary embodiment of FIG. 7, the configuration test module (122) and configuration correction module (123) implement rules for testing and correcting a configuration for a mobile phone platform to enable access to a WLAN using a plurality of component logic modules (710), (730), (740), (750) and (760), which are similar to the component logic modules of FIG. 5.

The component logic module (710) comprises one or more suitable wireless access protocol modules (711) (such as 802.1x protocol) for accessing a WLAN and a non-routing connecting client (712). Similar to those modules in the system of FIG. 5, the component logic module (730) comprises a RADIUS Protocol Module (731) and a user authentication module (732). The protocol module (740) comprises an LDAP protocol module (742) and a group filter search module (741). The protocol module (750) comprises a SQL database access module (751), and various tables such as a preferred network (SSID) lookup table (752), device requirements table (753), endpoint posture status table (754) and security requirements table (755). In addition, the system (700) comprises a security software and Updates module (760).

Figure 8:
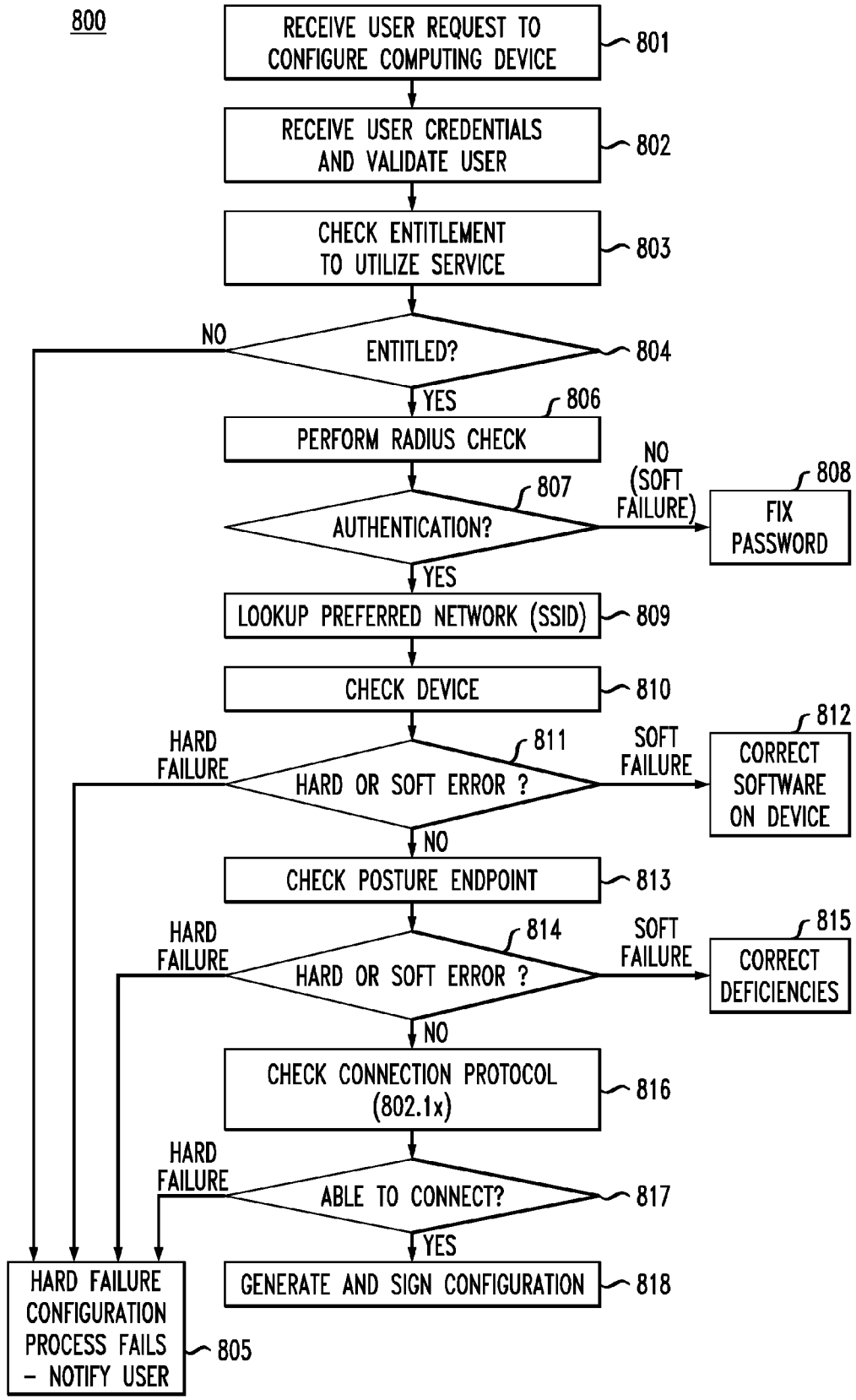
FIG. 8 is a flow diagram of a method for provisioning a computing device according to another exemplary embodiment of the invention.

FIG. 8 is a flow diagram of a method for provisioning a computing device according to an exemplary embodiment of the invention. More specifically FIG. 8 illustrates an exemplary mode of operation of the provisioning platform (700) depicted in FIG. 7. Referring to FIG. 8, a provisioning process is initiated when the provisioning platform (700) receives a user request to configure a computing device (step 801). In the exemplary embodiment, the user may request to configure a mobile phone client to enable access to a wireless network. The provisioning server (700) receives credentials provided by the user and the server utilizes the user credentials to authenticate the user (step 802). The user credentials may include a known user name and password previously established by the user to authenticate the identity of the user. The user credentials may include further information that enables the provisioning server (700) to determine if the user is entitled to use the services requested by the user. In one exemplary embodiment of the invention, step 802 is performed by the RADIUS protocol module (731) and user authentication module (732) to authenticate users or devices credentials for accessing the VPN intranet.

The provisioning server (700) then checks to determine if the authenticated (valid) user is entitled to utilize the requested service (step 803). This entitlement check process is a test rule (126) implemented by the test engine (125) during the configuration process. This test is performed using the protocol module (740) (e.g., LDAP protocol module (742) and group filter search (741) table).

If the user is determined to not be entitled to use the requested service (negative determination in step 804), then the user is deemed to have insufficient permissions and a configuration hard failure is deemed to occur (step 805). In this instance, the process fails and the user is notified that he/she has insufficient permissions to utilize the requested service.

If the user is determined to be entitled to use the requested service (affirmative determination in step 804), then the provisioning server (700) performs a RADIUS check process to determine is the user or device is authorized to access the network via an proper password (step 806). This process is a test rule (126) implemented by the test engine (125) during the configuration process via the RADIUS protocol module (731) to determine if the valid user has valid/authorized password. If user password is not valid (negative determination in step 807), then a soft failure is deemed to have occurred. In such instance, a correction process is performed by the soft failure correction engine (127) using a correction rule (128) to fix or otherwise confirm the user's password (step 808).

If the user is determined to be authentic (affirmative determination in step 807), then the provisioning server (700) performs a preferred network (SSID) lookup process (step 809). This lookup process is a test rule (126) implemented by the test engine (125) during the configuration process to select an entitled network from an access list. This process is performed using the protocol module (750) (e.g., SQL Database Access module (751) and preferred network lookup table (752)).

Next, once the preferred network is selected (step 809), the provisioning server (700) will perform a device check (step 810) to access information of the computing device and determine if the device contains the proper software for accessing the wireless network. In particular, the provisioning server (700) will utilize the protocol module (750) (database access (751) and device requirements table (753)) to determine if the given device has proper software/hardware/firmware, etc. for accessing the network (e.g., does mobile phone have proper operating system version, etc.). Depending on the results of the device check, either a hard or soft failure may result (step 811). For instance, a soft failure may be determined (in step 811) if the computing device does not have the proper or updated software, but the provisioning server (700) can automatically update/correct any software issues (step 812) via module (760). Otherwise, the device check (step 810) may result in a hard failure that cannot be corrected by the provisioning server (700) and the configuration process will fail and the user will be notified (step 805).

Next, the provisioning server (700) will perform a posture endpoint check (step 813) (via SQL database access module (751) and endpoint posture status table (754)) by comparing various security related criteria of the computing device against what is defined in the securing requirements table (755) as being acceptable for the given applications. Depending on the results of the endpoint posture check (step 813), either a hard or soft failure may result (step 814). For instance, a soft failure may be determined (in step 814) if the computing device does not have the proper security requirement settings but such settings can be automatically changed to correct deficiencies (via module 760) or manually changed by prompting the user to correct the deficiencies (step 815). Otherwise, the endpoint posture check (step 813) may result in a hard failure that cannot be corrected by the provisioning server (700) and the configuration process will fail and the user will be notified (step 805).

Next, the provisioning server (700) will perform a connection protocol check (step 816) to determine if the computing device can connect to the network. In particular, using the protocol module (711), the provisioning server will determine if the computing device can connect to the wireless network using the 802.1x protocol, for example, using the non-routing connection client module (712). This process involves connecting to, authenticating and logging onto the VPN on behalf of the computing device to perform a Boolean connection check, i.e., could device connect to the network, without passing traffic. This process ensures that the device will be able to connect when configured.

If the connection attempt fails (negative determination in step 817), then a hard failure is deemed to have occurred that cannot be corrected by the provisioning server (700) and the configuration process will fail and the user will be notified (step 805). On the other hand, if the connection is successful (affirmative determination in step 817), then the provisioning server (700) will generate and sign the configuration file for download to the mobile device (step 818).

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-8, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 9:
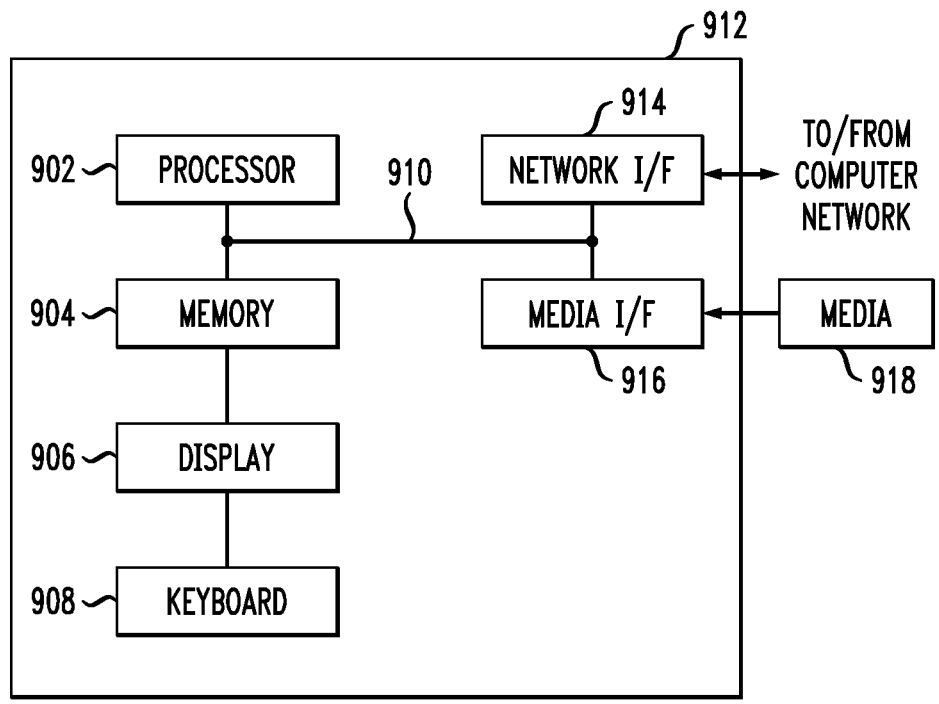
FIG. 9 illustrates a computer system in accordance with which one or more components/steps of the techniques of the invention may be implemented, according to an embodiment of the invention.

One or more embodiments can make use of software running on a general purpose computer or workstation. With reference to FIG. 9, such an implementation 900 employs, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. The processing device is preferably capable of processing video files. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer).

The processor 902, memory 904, and input/output interface such as display 906 and keyboard 908 can be interconnected, for example, via bus 910 as part of a data processing unit 912. Suitable interconnections, for example, via bus 910, can also be provided to a network interface 914, such as a network card, which can be provided to interface with a computer network, and to a media interface 916, such as a diskette or CD-ROM drive, which can be provided to interface with media 918.

A data processing system suitable for storing and/or executing program code can include at least one processor 902 coupled directly or indirectly to memory elements 904 through a system bus 910. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 908, display 906, pointing device, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 912 as shown in FIG. 9) running a server program. It will be understood that such a physical server may or may not include a display and keyboard. That is, it is to be understood that the components shown in FIGS. 1, 3, 5 and 7, for example, may be implemented on one server or on more than one server.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for provisioning a computing device by a provisioning server, comprising:
   receiving a user request to configure a computing device to access an on-line service;
   generating a device configuration file having configuration settings for configuring the computing device to enable access to the on-line service;
   validating the device configuration file before deploying the device configuration file to the computing device by testing the configuration settings of the device configuration file against the actual on-line service for which the device configuration file is generated to enable access to,
   wherein the provisioning server tests the configuration settings of the device configuration file by (i) automatically accessing an application server that provides the actual on-line service for which the device configuration file is generated to enable access to, using the computing device when configured with the configuration settings, (ii) utilizing credentials of the user to log into the application server and (iii) using the configuration settings of the device configuration file to attempt access to the actual on-line service on behalf of the user; and
   deploying the device configuration file to the computing device when the device configuration file is deemed valid,
   wherein validating further comprises determining if a configuration error occurs during testing of the device configuration file, and automatically performing an error correction process to attempt to correct the configuration error,
   wherein the method further comprises automatically terminating the error correction process if the configuration error cannot be corrected, and notifying the user of the configuration error without deploying the device configuration file to the computing device, and
   wherein the steps of receiving, generating, validating and deploying are performed by the provisioning server.

2. The method of claim 1, wherein validating comprises automatically determining if the user would be able to connect to a wireless network using the computing device, if the computing device was actually configured using the device configuration file settings.

3. The method of claim 1, wherein validating comprises automatically determining if the user would be able to access an e-mail server using the computing device, if the computing device was actually configured using the device configuration file settings.

4. The method of claim 1, wherein validating comprises:
   accessing a server status screen associated with the on-line service; and
   parsing the status screen to determine if any error messages or warnings are specified on the status screen with regard to one or more configuration settings.

5. The method of claim 1, wherein automatically performing an error correction process to attempt to correct the configuration error comprises automatically adding or modifying an appropriate access control list on a mail database of the user to enable access to the database.

6. An article of manufacture for provisioning a computing device by a provisioning server, the article comprising a non-transitory computer readable storage medium having one or more programs embodied therewith, wherein the one or more programs, when executed by a computer, perform steps of:
   receiving a user request to configure a computing device to access an on-line service;
   generating a device configuration file having configuration settings for configuring the computing device to enable access to the on-line service;
   validating the device configuration file before deploying the device configuration file to the computing device by testing the configuration settings of the device configuration file against the actual on-line service for which the device configuration file is generated to enable access to,
   wherein the provisioning server tests the configuration settings of the device configuration file by (i) automatically accessing an application server that provides the actual on-line service for which the device configuration file is generated to enable access to, using the computing device when configured with the configuration settings, (ii) utilizing credentials of the user to log into the application server and (iii) using the configuration settings of the device configuration file to attempt access to the actual on-line service on behalf of the user; and deploying the device configuration file to the computing device when the device configuration file is deemed valid, wherein validating further comprises determining if a configuration error occurs during testing of the device configuration file, and automatically performing an error correction process to attempt to correct the configuration error, wherein the steps further comprise automatically terminating the error correction process if the configuration error cannot be corrected, and notifying the user of the configuration error without deploying the device configuration file to the computing device.

7. The article of manufacture of claim 6, wherein validating comprises automatically determining if the user would be able to connect to a wireless network using the computing device, if the computing device was actually configured using the device configuration file settings.

8. The article of manufacture of claim 6, wherein validating comprises automatically determining if the user would be able to access an e-mail server using the computing device, if the computing device was actually configured using the device configuration file settings.

9. The article of manufacture of claim 6, wherein validating comprises:
   accessing a server status screen associated with the on-line service; and
   parsing the status screen to determine if any error messages or warnings are specified on the status screen with regard to one or more configuration settings.

10. The article of manufacture of claim 6, wherein automatically performing an error correction process to attempt to correct the configuration error comprises automatically adding or modifying an appropriate access control list on a mail database of the user to enable access to the database.

11. An apparatus for provisioning a computing device by a provisioning server, the apparatus comprising:
   a memory; and
   a hardware processor coupled to the memory and configured to execute code stored in the memory for:
      receiving a user request to configure a computing device to access an on-line service;
      generating a device configuration file having configuration settings for configuring the computing device to enable access to the on-line service;
      validating the device configuration file before deploying the device configuration file to the computing device by testing the configuration settings of the device configuration file against the actual on-line service for which the device configuration file is generated to enable access to, wherein the provisioning server tests the configuration settings of the device configuration file by (i) automatically accessing an application server that provides the actual on-line service for which the device configuration file is generated to enable access to, using the computing device when configured with the configuration settings, (ii) utilizing credentials of the user to log into the application server and (iii) using the configuration settings of the device configuration file to attempt access to the actual on-line service on behalf of the user; and deploying the device configuration file to the computing device when the device configuration file is deemed valid, wherein validating further comprises determining if a configuration error occurs during testing of the device configuration file, and automatically performing an error correction process to attempt to correct the configuration error, wherein the hardware processor is further configured to execute code stored in the memory for automatically terminating the error correction process if the configuration error cannot be corrected, and notifying the user of the configuration error without deploying the device configuration file to the computing device.

12. The apparatus of claim 11, wherein validating comprises automatically determining if the user would be able to connect to a wireless network using the computing device, if the computing device was actually configured using the device configuration file settings.

13. The apparatus of claim 11, wherein validating comprises automatically determining if the user would be able to access an e-mail server using the computing device, if the computing device was actually configured using the device configuration file settings.

14. The apparatus of claim 11, wherein validating comprises:
   accessing a server status screen associated with the on-line service; and
   parsing the status screen to determine if any error messages or warnings are specified on the status screen with regard to one or more configuration settings.

15. The apparatus of claim 11, wherein automatically performing an error correction process to attempt to correct the configuration error comprises automatically adding or modifying an appropriate access control list on a mail database of the user to enable access to the database.

* * * * *